June 9, 1959     A. H. LOCKHEED     2,889,819
FUEL MIXER FOR AUTOMOBILE ENGINES
Filed Jan. 2, 1958
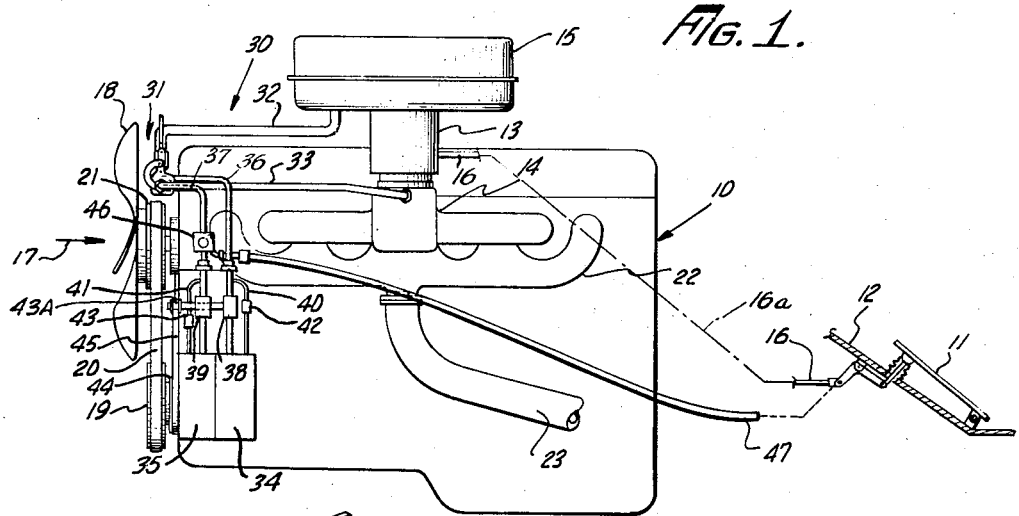
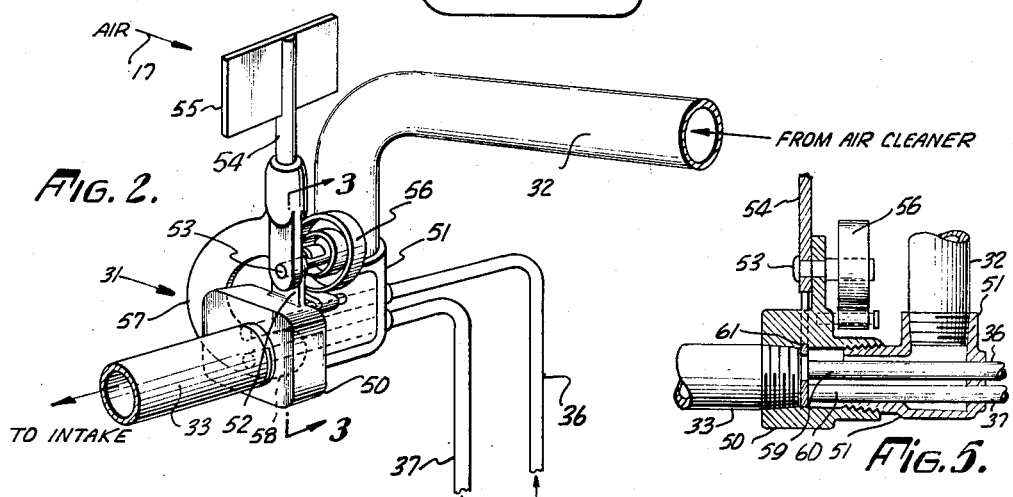
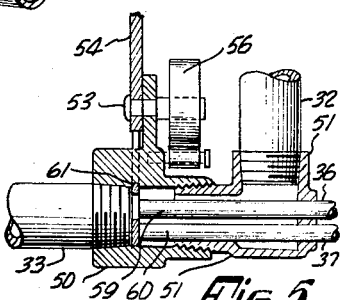
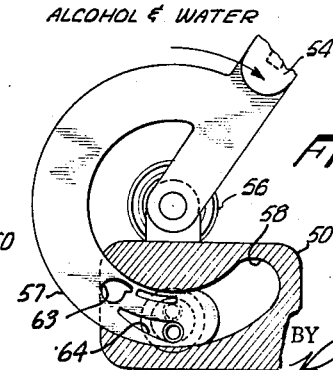
INVENTOR.
ALLAN H. LOCKHEED
BY
ATTORNEYS United States Patent Office 2,889,819
Patented June 9, 1959

2,889,819

FUEL MIXER FOR AUTOMOBILE ENGINES

Allan H. Lockheed, Twentynine Palms, Calif., assignor of one-half to John A. Lockheed, Sherman Oaks, Calif.

Application January 2, 1958, Serial No. 706,745

4 Claims. (Cl. 123—25)

This invention relates generally to fuel-mixing devices for automotive internal combustion engines, and more particularly to a mixer which automatically responds to engine speed and/or car movement to supplement or replace the gasoline-air vapor mixture. In its preferred form, the invention comprises a draft operated valve for admitting only alcohol and air to the intake mainfold when the car is idling, and for admitting predetermined percentages of water, or other combustion corrective, under certain load conditions, while depriving the engine of all fuel during deceleration conditions.

Many modern cities are plagued by polluted air called "smog." Smog is usually blue or yellow in tint, and hangs in heavy clouds over the city and surrounding areas, irritating eyes and lungs, and damaging crops. While industrial installations and incinerators produce a certain amount of smog, the greater part of it has been traced to unburned hydrocarbons from the exhaust of the gasoline engines of automobiles. Indeed, tests have indicated that smog usually first becomes noticeable when the gasoline consumption in a metropolitan area reaches 12 tons per square mile per day. In some large cities, Los Angeles for instance, the 1957 consumption of gasoline is about 25 tons of gasoline per square mile per day in the central areas.

The most important single pollutant found in the smog-laden atmosphere of a big city is a mixture of unburned hydrocarbons. These hydrocarbons, comprised mostly of the light end gasoline vapors, are irritating in themselves. Moreover, they tend to react with oxides of nitrogen and ozone in the presence of sunlight to form other vapors and solid particles which are irritating to human beings and animals, and destructive to vegetation and rubber. Localities which have heavy rainfall, high winds, or little sunlight are somewhat protected from the worst accumulations of smog. But cities which have little rainfall, little wind, and much sunlight have only one way, as far as is known at present, to reduce smog, and that it to reduce the amount of hydrocarbons emitted by automotive exhaust.

In the four driving cycles of the automobile—acceleration, deceleration, idling, and cruising, exhaust gases contain several hundred parts per million by weight of unburned or partially burned hydrocarbons. Indeed, during deceleration the worst cycle for production of unburned hydrocarbons in the exhaust gases, most automobiles produce more than 5,000 parts per million of smog-producing hydrocarbons.

Idling is second only to deceleration in the rate at which it produces pollutants; 1,000 to 2,000 parts per million of unburned hydrocarbons are found in the exhaust from most cars. Acceleration and cruising, while less productive of pollutants than deceleration and idling, produce several hundred parts per million, depending upon the particular characteristics of the engine, the manner of acceleration, and engine load conditions. It is well known that rapid acceleration wastes more unburned gasoline out the exhaust than gradual acceleration. It is less well known that each engine has a cruising condition, usually at about 25 percent of maximum load, at which its fuel burning is at maximum efficiency.

In the past, many fuel-mixing devices have been developed for improving the combustion of a gasoline-air mixture, but the conservation of fuel during deceleration and idling having been very much neglected. For example, it has been recognized that it is desirable to introduce a minor fraction of water vapor into the gasoline-air mixture to prevent engine knock at loads from about 25 percent of full load up to maximum. However, previously known systems have generally added water vapor at a rate which was not carefully adjusted to the particular type of engine and its requirements. Moreover, previously known systems have not provided for adding combustion correctives other than water in controlled amounts as load increased.

Previously known systems have also been defective as regards control of smog production, because fuel mixing has generally been controlled by intake manifold pressure or by some other factor which was not necessarily related to complete combustion of fuel. Indeed, an adequate fuel mixer for preventing smog production must be responsive to more than one engine variable, since it will otherwise fail to deal sufficiently with the deceleration cycle, the worst smog-producing cycle of automotive engine operation.

It is a major object of the present invention to provide a fuel mixer which is sensitive to three engine factors, engine speed, vehicle speed, and throttle opening.

It is another major object of the invention to supplement or entirely replace gasoline with a special completely burning fuel during idling, and, if desired, during parts of the other operating cycles of the engine.

It is still another important object of the invention to decrease or completely cut off the supply of fuel to the engine during deceleration.

It is another important object of the invention to provide a valve for supplying varying amounts of water and/or other combustion corrective additives in variable amounts during acceleration and cruising.

Associated with the foregoing, it is an object of the present invention to provide a valve which may be readily calibrated for a particular engine to vary the rate at which combustion corrective is added as required for optimum performance.

Also, the device materially decreases oil consumption in older engines by greatly reducing the vacuum under deceleration conditions, which normally pulls oil past the rings.

The foregoing objects and advantages of the invention will best be understood from the following description of a preferred specific embodiment, taken in connection with the accompanying drawings, in which:

Figure 1 is a side elevational view of an automobile engine provided with the fuel mixer of the present invention;

Figure 2 is an enlarged perspective view of the fuel mixer valve employed in the device of Figure 1;

Figures 3 and 4 are vertical sectional views of the valve of Figure 2, as viewed in the direction of the arrows 3—3 idling and maximum speed positions of the valve being shown, respectively;

Figure 5 is a longitudinal sectional view through the valve of Figure 2, as viewed in the direction of the arrows 5—5 in Figure 3; and Figure 6 illustrates an alternative form of valve shutter opening.

In Figure 1, an internal combustion engine, indicated generally by the numeral 10, is seen to follow schematically the general construction of a typical front-end mounted, water-cooled automobile engine, controlled by a foot throttle 11 mounted on the floor 12 of the driver's compartment.

A mixture of gasoline and air is supplied to the engine 10 by way of a carburetor 13 and intake manifold 14, the air having been cleaned by an air cleaner 15 mounted above the carburetor 13. The carburetor 13 is operated by the foot pedal 11 through a mechanism fragmentarily indicated at 16, and 16a, but not illustrated in detail since it may be of entirely conventional design. The carburetor 13 is likewise of conventional design, and is operated in a conventional manner, except that its idling jets are completely turned off so that no gasoline is supplied to the engine 10 unless the throttle 11 is depressed by the operator.

Air moves past the engine 10, having passed through a water-cooling radiator (not shown) in the direction of the arrow 17, being impelled by a fan 18 which is driven in the conventional manner by means of a crank shaft pulley 19, a fan belt 20, and a fan pulley 21.

The engine 10 is also provided with an exhaust manifold 22 and exhaust pipe 23 which may be of any conventional type.

The novelty of the system resides in the fuel-mixer system indicated generally by a numeral 30, in which the most important operative part is a fuel-mixer valve 31 mounted directly behind the fan 18 so as to receive an air draft which is the resultant of air impelled by the fan 18, and air flow induced by the forward movement of the vehicle in which the engine 10 is mounted. As will be explained hereinafter in connection with Figure 2, the valve 31 operates in response to said draft and thus is responsive to both engine speed and vehicle speed.

The valve 31 receives clean air from the air cleaner 15 by way of line 32, and delivers a vapor mixture to be described in detail hereinafter, to the intake manifold 14 through vapor mixture line 33.

The valve 31 is supplied with two different supplementary fuel materials, preferably liquid, from storage tanks 34 and 35. Tank 34 contains an idling fuel which is used to keep the engine running at idling speed instead of gasoline because of complete combustion characteristics; for example, methyl alcohol or certain other slightly higher alcohols are adequate in small quantities to keep the average automobile engine idling without producing any substantial amount of pollutants in the exhaust gases. Tank 35 contains a material, preferably liquid, which may be termed a combustion corrective, as it tends to reduce knocking and encourage complete combustion of gasoline during acceleration and as the load or velocity of the automobile increases; water is the most commonly used combustion corrective, but it will be understood that special gasolines, including special concentrations of anti-knock materials, butane, or preferably, a mixture of alcohol and water may be used as a combustion corrective. It will be understood that a combustion corrective includes both anti-knock substances such as water or lead compounds and supplemental fuels such as ethyl alcohol, iso-propyl alcohol or the like.

The idling fuel and the combustion corrective are pumped to the valve 31 by way of lines 36 and 37, respectively, by means of pumps 38 and 39. Preferably, the pumps 38 and 39 are paralleled with pass-back lines 40 and 41 in which are mounted by-pass valves 42 and 43 for the return of the respective liquids when they are being pumped in excess of the demands of the mixer valve 31. The pumps 38 and 39 may conveniently be driven by means of a second crank shaft pulley 44, a pump belt 45 and pump pulley 43A.

A deceleration shut-off 46 is mounted in the combustion corrective line 37 and controlled by the position of the throttle pedal 11 through any suitable mechanical or other means, indicated generally by the line 47. As will be explained in greater detail hereinafter, the shut-off 46 coacting with the line 47, prevents any combustion corrective from flowing through line 37 and to the engine 10 unless the foot pedal 11 is depressed so that a gasoline-air mixture is moving through the intake manifold 14. Thus, if the mixer valve 31 is moved into an open position by forward velocity of the automobile, the shut-off 46 will nevertheless prevent the introduction of any combustion corrective, water, or alcohol, or otherwise, if the engine 10 is merely being used as a decelerating brake.

The mixing valve 31 is shown in detail in the perspective view of Figure 2. A valve body 50 is mounted at the upstream end of the vapor mixture line 33, and receives clean air from the air line 32 by way of an elbow 51.

A bracket 52 on the upper part of valve body 50 provides a pivot 53 for an upwardly extending vane arm 54, the upper swinging end of which carries a vane 55 disposed transversely to air moving in the direction of the arrow 17, i.e., from the fan 18 and the forward movement of the vehicle in which engine 10 is mounted.

Although the described embodiment makes use of pumps 38 and 39, it will be understood that these may be eliminated in alternative designs, and suction alone relied upon for introducing both idling fuel and combustion correctives.

As seen in Figure 2, the vane 55 is disposed in a vertical position, the position ordinarily occupied during idling of the engine 10. The vane is urged into the vertical position by a coil spring 56 which resists backward deflection of the vane 55 by the air draft 17. However, as greater engine speed increases the blast from fan 18, or forward movement of the vehicle increases air flow from the front, or both increase, the vane 55 overcomes the resilient resistance of the spring 56 and is deflected backwards in the direction of the arrow 17. Thus, the vane 55 swings between two extreme positions, a vertical position for idling at standstill, and a backward tilted position for maximum air draft.

The vane arm 54 carries a valve shutter plate 57 which swings about the vane pivot 53 in a plane normal to the flow of air through the valve body 50. The valve shutter plate 57 is preferably of thin sheet metal stock which is closely but freely received in an arc-shaped slot 58 in the interior of valve body 50.

The positions of the valve arm 54 and the valve shutter plate 57 in vertical idling position and tilted back maximum air draft position are shown in Figures 3 and 4, respectively. The sectional views of Figures 3 and 4 also reveal the special shape of the slot 58.

The valve shutter plate 57 is seen to be provided with several openings for controlling the mixture of liquids, or other substances, from lines 36 and 37 with air passing through the valve body 50.

In Figure 5 a longitudinal sectional view of the elbow 51 reveals that the lines 36 and 37 enter the back of the elbow 51 and terminate in nozzles 59 and 60 at the intake 61 of the valve body 50, and in the plane of the slot 58 and the upstream surface of the valve shutter plate 57.

Thus, during idling at standstill, the air draft in the direction of arrow 17 is insufficient to deflect the vane 55, and it stands in a vertical position, as shown in Figures 1, 2, and 3, and as seen in Figure 3, an idling fuel opening 63 supplies the only fuel which the engine 10 receives during idling, all gasoline being shut off at carburetor 14.

Also, it will be noted from Figure 3, that the elongated opening 64 provided for the admission of combustion corrective does not extend to the line 37 when the valve shutter plate 57 is in the idling position. Thus, no combustion corrective passes to the engine 10 during idling. It will be understood, however, that the slot 64 may be extended to admit some combustion corrective during idling if that is found to be desirable. Usually it is not desirable to admit any combustion corrective fluid until after the engine has not only reached idling but has exceeded about 25 percent of load, or the vehicle has attained a substantial forward velocity.

However, it is an alternative form of the invention to begin the gradual introduction of corrective fluid as soon as idling speed is exceeded.

Figure 4 shows the position of the valve shutter plate 57 when the air draft 17 is at a maximum, deflecting the vane arm 54 backwards to its maximum displacement from vertical. It is seen from the shape of the openings in the shutter plate 57 that the idling fuel is shut off as soon as the engine speed is above idling. However, as engine or vehicle speed increases, and the vane arm 54 is pushed backwards by the air draft 17, more and more combustion corrective liquid is admitted to line 33 through the combustion corrective opening 64. Of course, it will be understood, that although an opening 64 of gradually increasing width is shown for the particular embodiment illustrated, the width of opening 64 may be varied as required by the operating characteristics of the particular engine. Normally, as load increases, more and more combustion corrective fluid should be supplied. There are factors at work to increase the supply, the changing manifold pressure and the increasing width of the opening 64. These two must be related by calibration, and may even result in an opening 64 of irregular width, or one diminishing, at least in part, with greater vane arm deflection.

As previously stated, the preferred substances for idling fuel and combustion corrective are, respectively, ethyl alcohol, and a mixture of alcohol and water. Although ethyl alcohol is preferred, other light alcohols may also be used. The preferred mixture for the combustion corrective is about 75 percent water and 25 percent alcohol, and in any event a mixture predominating in water.

Instead of mixing the alcohol and water for the combustion corrective liquid, it may be desired to use line 36 exclusively for alcohol and line 37 exclusively for water, and producing any mixture desired at the valve 31. Figure 6 illustrates the type of openings 63a and 64a which might suitably be used with such an arrangement.

It is ordinarily preferred to admit as large a draft of air as possible through the vapor mixture line 33. Consequently, it may be desirable to provide an extra air passage slot 65 in the shutter plate 57 so that, at high loads, the air passed by the shutter plate 57 will be at a maximum possible without opening the nozzle 59 which would admit idling fluid during cruising.

While I have described in the foregoing a preferred specific embodiment, and a few variants thereof, it will be seen that the illustrative description is not to be taken as limiting the spirit or scope of the invention, since many ways of elaborating and varying it will be apparent to those skilled in the art of internal combustion engines. The foregoing specification is therefor to be understood as not asserting any limitation not found in the following claims.

I claim:

1. A fuel-mixer system for an automotive engine, which system includes: an idling fuel supply means for supplying a fuel capable of satisfactory combustion under idling conditions; a draft-operated vane means displaceable from a minimum draft position at idling by increased draft from the increased speed of either said engine or the vehicle in which said engine is mounted; valve means operated by said vane means for passing said idling fluid to said engine only at substantially minimum draft conditions.

2. A fuel-mixer system for an automotive engine, which system includes: an air draft-operated vane means displaceable from a minimum draft position at idling by increased draft from the fan of said engine or forward movement of the vehicle in which said engine is mounted; valve means operated by said vane means; idling fuel supply means for supplying idling fuel to said valve means; combustion corrective supply means for supplying combustion corrective to said valve means; and means in said valve means for passing idling fuel through said valve means to said engine at a maximum rate when said vane means indicates idling; and means in said valve means for passing said combustion corrective through said valve means to said engine when said vane means indicates increased air draft.

3. A fuel-mixer system for an internal combustion engine mounted in an automotive vehicle, which system includes: an auxiliary air line for supplying auxiliary air to said engine; a mixer valve for introducing two different additives into said auxiliary air stream; idling fuel supply means for supplying idling fuel to said valve means to one of the additive inlets thereof; combustion corrective supply means for supplying combustion corrective material to said valve means through the second of its additive inlets; and a deceleration cut-off for preventing fuel from passing through said valve means to said engine during deceleration; and an air draft-operated vane means displaceable from a minimum draft position to a maximum draft position for operating said valve means.

4. A fuel-mixer system for an internal combustion engine for propelling an automotive vehicle, which system includes: an auxiliary air line for introducing auxiliary air into said engine; a valve means mounted in said auxiliary air line for controlling the admission of additives to said auxiliary air; movable shutter means adapted to move transversely to the flow of auxiliary air to said auxiliary air line; vane means operated by air draft from the fan of said engine and the forward speed of said vehicle, said vane means operating to move said valve shutter; resilient spring means tending to return said vane means to a zero draft position; idling fuel supply means for supplying idling fuel adapted to burn completely under idling conditions to the surface of said movable valve shutter; combustion corrective supply means adapted to facilitate completeness of combustion of gasoline-air mixture in said engine under load conditions for supplying combustion corrective to the face of said movable valve shutter; orifice means in said valve shutter for admitting idling fuel into said auxiliary air stream and allowing the passage of some auxiliary air through said auxiliary air line when idling conditions are indicated by a minimum draft position of said vane means; orifice means in said vane means for admitting said combustion corrective into said auxiliary air stream at variable rates proportionate to the displacement of said vane means from minimum draft position; and a deceleration cut-off for cutting off said combustion corrective when no gasoline is being supplied to said engine.

No references cited.